US009835290B2

(12) United States Patent
Hunt

(10) Patent No.: US 9,835,290 B2
(45) Date of Patent: Dec. 5, 2017

(54) SUSPENSION ARM

(71) Applicant: Kenex (Electro-Medical) Limited, Harlow, Essex (GB)

(72) Inventor: Kenneth Charles Hunt, Stansted Mountfitchet (GB)

(73) Assignee: Kenex (Electro-Medical) Limited, Harlow Essex (GB)

(*) Notice: Subject to any disclaimer, the term of this patent is extended or adjusted under 35 U.S.C. 154(b) by 0 days.

(21) Appl. No.: 15/034,480

(22) PCT Filed: Oct. 23, 2014

(86) PCT No.: PCT/GB2014/053155
§ 371 (c)(1),
(2) Date: May 4, 2016

(87) PCT Pub. No.: WO2015/063456
PCT Pub. Date: May 7, 2015

(65) Prior Publication Data
US 2016/0265717 A1 Sep. 15, 2016

(30) Foreign Application Priority Data
Nov. 4, 2013 (GB) .................................. 1319447.7

(51) Int. Cl.
A47H 1/10 (2006.01)
F16M 13/02 (2006.01)
(Continued)

(52) U.S. Cl.
CPC ............. F16M 13/022 (2013.01); A47H 1/10 (2013.01); A61G 12/004 (2013.01);
(Continued)

(58) Field of Classification Search
CPC .. F16M 11/121; F16M 11/10; F16M 11/2014; F16M 2200/044; F16M 11/08;
(Continued)

(56) References Cited

U.S. PATENT DOCUMENTS 2,503,738 A * 4/1950 Horton .................... E04G 25/08
285/404
3,856,253 A * 12/1974 Seebinger ............. F16B 7/1481
248/411
(Continued)

FOREIGN PATENT DOCUMENTS

DE 20014909 U1 10/2000
EP 1277421 A1 1/2003
(Continued)

OTHER PUBLICATIONS

English machine translation of German Patent No. DE 20014909 U1, European Patent Office, Oct. 26, 2000.
(Continued)

Primary Examiner — Leslie A Nicholson, III
Assistant Examiner — Taylor L Morris
(74) Attorney, Agent, or Firm — DASCENZO Intellectual Property Law, P.C.

(57) ABSTRACT

An apparatus comprising an arm with a depending hollow attachment housing, into which is inserted a corresponding attachment portion of a depending device. The housing and attachment portion both have corresponding openings which come into alignment when the attachment portion is inserted into the housing. The apparatus comprises a securing segment which passes through the aligned openings in the housing and attachment portion to prevent the vertical separation of the housing and attachment portion, and a sleeve which surrounds the housing and is vertically moveable between a first position wherein it exposes the openings
(Continued)

and securing segment and a second position wherein it covers the securing segment thereby preventing the securing segment from becoming dislodged. The housing comprises a removable delimiter which reduces the allowable vertical movement of the sleeve so that its vertical movement is restricted so as to prevent the sleeve adopting its first position.

16 Claims, 5 Drawing Sheets

(51) Int. Cl.

| | | |
|---|---|---|
| *A61G 12/00* | (2006.01) | |
| *F16M 11/04* | (2006.01) | |
| *F16M 11/08* | (2006.01) | |
| *F16M 11/20* | (2006.01) | |
| *A47F 5/00* | (2006.01) | |
| *A47F 7/00* | (2006.01) | |
| *F16M 11/00* | (2006.01) | |
| *F16M 13/00* | (2006.01) | |
| *E04G 3/00* | (2006.01) | |
| *B42F 13/00* | (2006.01) | |
| *F16B 7/10* | (2006.01) | |
| *B25G 3/02* | (2006.01) | |
| *F16D 1/00* | (2006.01) | |
| *F16D 1/08* | (2006.01) | |
| *F16M 11/10* | (2006.01) | |

(52) U.S. Cl.
CPC ........... *F16M 11/041* (2013.01); *F16M 11/08* (2013.01); *F16M 11/2014* (2013.01); *F16M 13/027* (2013.01); *F16M 11/10* (2013.01); *F16M 2200/021* (2013.01); *F16M 2200/024* (2013.01); *F16M 2200/027* (2013.01); *F16M 2200/028* (2013.01); *F16M 2200/06* (2013.01); *F16M 2200/063* (2013.01)

(58) Field of Classification Search
CPC ............. F16M 11/2064; F16M 13/022; F16M 13/027; F16M 11/06; F16M 11/041; F16M 2200/021; F16M 2200/027; F16M 2200/022; F16M 2200/028; F16M 2200/024; G06F 1/1601; A61B 90/50; A61G 12/004; A61G 12/008
USPC .......... 248/276.1, 278.1, 280.11, 122.1, 324, 248/343; 403/104, 362
See application file for complete search history.

(56) References Cited

U.S. PATENT DOCUMENTS

| | | | | |
|---|---|---|---|---|
| 4,673,154 | A * | 6/1987 | Karapita | A61M 5/1415 248/320 |
| 4,684,230 | A * | 8/1987 | Smith | F16M 11/24 248/176.1 |
| 4,915,125 | A * | 4/1990 | Lester | F16K 31/46 137/368 |
| 5,039,043 | A * | 8/1991 | Hodge | B01L 9/00 248/125.8 |
| 5,720,570 | A * | 2/1998 | Cole | A61G 15/16 248/291.1 |
| 6,779,767 | B2 * | 8/2004 | Kuhn | F16M 11/04 248/276.1 |
| 6,895,709 | B1 * | 5/2005 | Krien | A47B 83/02 42/94 |
| 2005/0242261 | A1 * | 11/2005 | Brahler | E04B 9/006 248/326 |
| 2006/0158836 | A1 * | 7/2006 | Phillips | F16M 11/08 361/679.22 |
| 2006/0202091 | A1 * | 9/2006 | Oddsen, Jr. | F16M 11/24 248/122.1 |
| 2007/0145202 | A1 * | 6/2007 | Hsieh | F16B 7/1427 248/161 |
| 2009/0039224 | A1 * | 2/2009 | Altonji | B22D 19/00 248/276.1 |
| 2010/0044541 | A1 * | 2/2010 | Sapper | F16M 11/10 248/371 |
| 2010/0252373 | A1 * | 10/2010 | Oddsen, Jr. | F16F 9/3242 188/67 |
| 2014/0092568 | A1 * | 4/2014 | Kim | H05K 7/00 361/752 |

FOREIGN PATENT DOCUMENTS

| | | |
|---|---|---|
| GB | 2475298 A | 5/2011 |
| WO | WO 01/90631 A1 | 11/2001 |

OTHER PUBLICATIONS

English abstract of PCT Patent Application Publication No. WO 01/90631 A1, International Bureau of WIPO, Nov. 29, 2001.
Search Report issued in connection with United Kingdom Patent Application No. GB 1319447.7, 2 pages, United Kingdom Intellectual Property Office, dated Apr. 30, 2014.

* cited by examiner

SUSPENSION ARM

TECHNICAL FIELD

The present invention relates to an apparatus for supporting a depending device, particularly but not exclusively a medical device, and to a method of adapting an existing apparatus.

BACKGROUND AND PRIOR ART

Suspension arms, which are typically mounted on an upper hard point such as a ceiling, have been employed for some time to suspend equipment. Such suspension arms are used extensively in the medical area and also in other areas such as in hairdressers, whenever the suspension of fairly heavy equipment is needed.

A general feature of such suspension arms is that the equipment is generally removable and detachable from the arm, so a means of safe attachment to the arm is essential.

One common design involves a part of the suspension arm having a downwardly depending hollow housing, into which is inserted a corresponding element of the equipment to be suspended. The hollow housing and the insert both have an opening, which become aligned when fully inserted. A safety securing means is then inserted through the openings, which acts as a locking pin to prevent the subsequent removal of the insert from the housing.

Furthermore, to prevent the safety securing means from becoming dislodged from the openings in use, a sleeve is generally provided which covers the securing means, keeping it in place in the openings.

However, such sleeves necessarily can be moved into such a position that the safety securing means is exposed, as this is required to be able to insert the safety securing means in the first place.

Thus, steps have been taken to prevent the sleeve from moving into an unsafe position where the safety securing means could become dislodged.

One solution to the problem of the sleeve moving to an unsafe position is to add screws and the like to lock the sleeve in a safe position. In one solution, an internal nut is employed.

However, sometimes such devices need servicing, checked for compliance with safety requirements or for inspection following a collision. In such cases it is possible that such a suspension arm can be reassembled incorrectly, e.g. screws or nuts can be incorrectly placed, leading to the sleeve being capable of, or actually being in, an unsafe condition, exposing the safety securing means. When a screw or nut is not in place this can be difficult or impossible to see by visual inspection, leading to the error going uncorrected and increasing the risk of suspension failure.

In 2009 a large supplier of suspension arms issued a Field Safety Notice, which required that approximately 90,000 such suspension arms be checked for safety concerns. There has been at least one reported case of a supported device becoming detached following such a safety check.

Thus, improvements in preventing the unintended detachment of suspended devices is desirable.

SUMMARY OF INVENTION

In a first aspect, the invention relates to an apparatus for supporting a depending device, the apparatus comprising an arm, one end of which comprises a depending hollow attachment housing, into which is inserted a corresponding attachment portion of the depending device, the attachment housing and attachment portion both having corresponding openings which come into alignment when the attachment portion is inserted into the attachment housing, the apparatus comprising a securing means which passes through the aligned openings in the attachment housing and attachment portion thereby to prevent the vertical separation of the attachment housing and attachment portion, the apparatus comprising a sleeve which surrounds the attachment housing and is vertically moveable between a first position wherein it exposes the openings and securing means and a second position wherein it covers the securing means thereby preventing the securing means from becoming dislodged in use, characterised in that, the attachment housing comprises a removable delimiter which reduces the allowable vertical movement of the sleeve so that in use its vertical movement is restricted so as to prevent the sleeve adopting its first position.

Thus, by restricting the available vertical movement of the sleeve, the delimiter prevents the possibility of the sleeve entering an unsafe condition, regardless of whether a screw or nut has been omitted. Additionally, the delimiter is visible on the exterior of the apparatus, so a simple visual check allows an operator to be reassured that the suspension arm is safe without needing to check for the integrity of screws or nuts.

Furthermore, the present invention allows for existing suspension arms to be retrofitted with a delimiter, to improve the safety without the need for replacing the entire suspension arm.

Thus, in a second aspect, the invention relates to a method of adapting an apparatus for supporting a depending device, the apparatus comprising an arm, one end of which comprises a depending hollow attachment housing, into which is inserted a corresponding attachment portion of the depending device, the attachment housing and attachment portion both having corresponding openings which come into alignment when the attachment portion is inserted into the attachment housing, the apparatus comprising a securing means which passes through the aligned openings in the attachment housing and attachment portion thereby to prevent the vertical separation of the attachment housing and attachment portion, the apparatus comprising a sleeve which surrounds the attachment housing and is vertically moveable between a first position wherein it exposes the openings and securing means and a second position wherein it covers the securing means thereby preventing the securing means from becoming dislodged in use, the method comprising attaching a removable delimiter to the attachment housing thereby reducing the allowable vertical movement of the sleeve so that its vertical movement is restricted so as to prevent the sleeve adopting its first position.

The depending device can be any of a wide variety of devices. However preferably the depending device is a medical device, particularly an x-ray shield.

The suspension arm is typically a spring arm that can rotate horizontally and move vertically.

The hollow attachment portion is typically a hollow tube into which is inserted a cylindrical attachment portion of the depending device. However other shapes of attachment portion can be employed.

The opening in the attachment housing is preferably a horizontal slit. Such a slit allows for the insertion of an elongate securing means, which provides a better securing means. Likewise the opening in the attachment portion comprises a similarly dimensioned slit, notch or radial groove. A radial groove is preferred because this allows the attachment portion to be inserted into the attachment housing in any orientation and still align with the opening on the attachment housing. A radial groove also permits the rotational movement of the attached device whilst remaining firmly attached.

The delimeter is removable, which means that it can be applied and removed from the apparatus without disturbing any other component of the apparatus.

The delimeter preferably takes the form of a protrusion extending outwards from the attachment housing. In use the sleeve will collide with the protrusion before it can attain an unsafe first position exposing the securing means.

Preferably the delimeter provides a protrusion which extends around the circumference of the attachment housing. This allows for a variety of delimeters which are easy to install and remove whilst also providing a clearly visible protrusion form any angle of viewing.

Thus preferably the delimeter takes the form of a collar passing substantially around the circumference of the attachment portion.

BRIEF DESCRIPTION OF THE DRAWINGS

The invention will now be illustrated by way of example, with reference to the following figures, in which.

DETAILED DESCRIPTION

Figure 1:
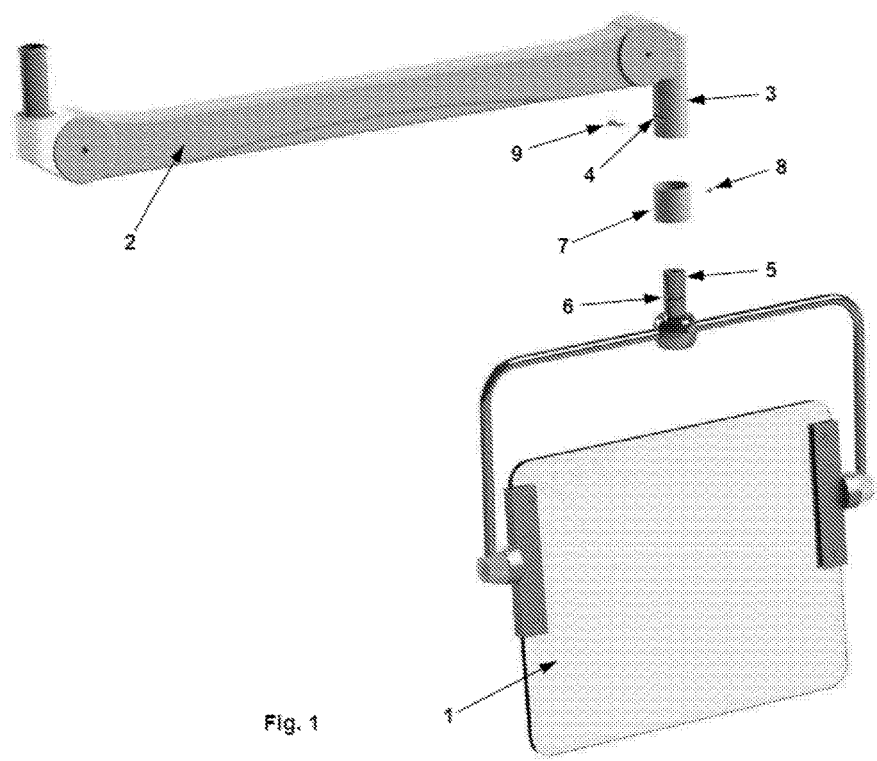
FIG. 1 shows an exploded perspective view of a known suspension arm suspending a medical x-ray screen.

Turning to the figures, FIG. 1 shows a medical x-ray device 1 being supported by a suspension arm 2. The suspension arm is a spring arm that can rotate horizontally and move vertically. The device 1 can rotate on its vertical axis.

The suspension arm 2 has a tubular connecting piece 3 which constitutes the depending hollow attachment housing. The connecting piece 3 has a horizontal slit opening 4.

The device 1 comprises a corresponding cylindrical connecting component 5 which constitutes the attachment portion. The connecting component 5 comprises a radial groove 6.

A sliding sleeve 7 is provided, which has a clearance hole for screw 8.

Figure 2:
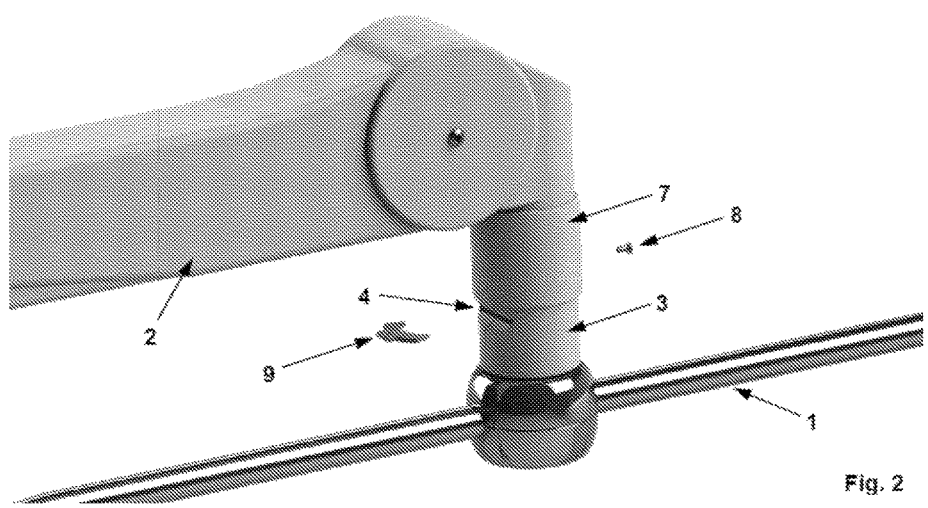
FIG. 2 shows a perspective view showing detail of the attachment arrangement of the known suspension arm shown in FIG. 1.

FIG. 2 shows the arrangement shown in FIG. 1 when the components are assembled. It can be seen that connecting component 5 is inserted into connecting piece 3, which has the result that horizontal slit opening 4 and radial groove 6 are aligned. To lock the two connecting pieces together, securing segment 9 constituting the securing means, is inserted into opening 4 and groove 6.

Sleeve 7 is then moved downwards to cover securing segment 9 to prevent it from becoming dislodged. Finally securing screw 8 ensures that the sleeve does not inadvertently move to an unsafe position where the securing segment is exposed and could become dislodged.

In the event that screw 8 comes loose or is not replaced during a service or maintenance of the suspension arm, it is possible that sleeve 7 could move upwards in use. In such a case the sleeve can move upwards to the position shown in FIG. 2, which then allows for the possibility of the securing segment 9 becoming dislodged and the mounted device 1 falling to the floor.

Figure 3:
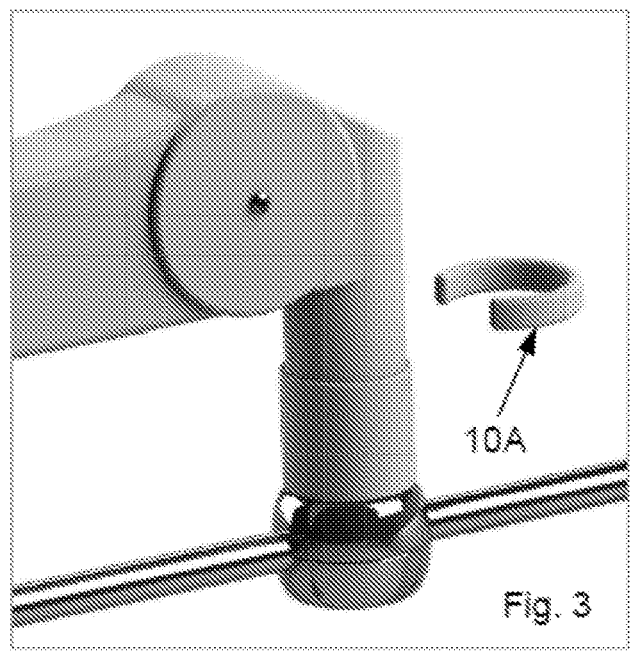
FIG. 3 shows a perspective view of the attachment means of a suspension arm according to the present invention.
Figure 4:
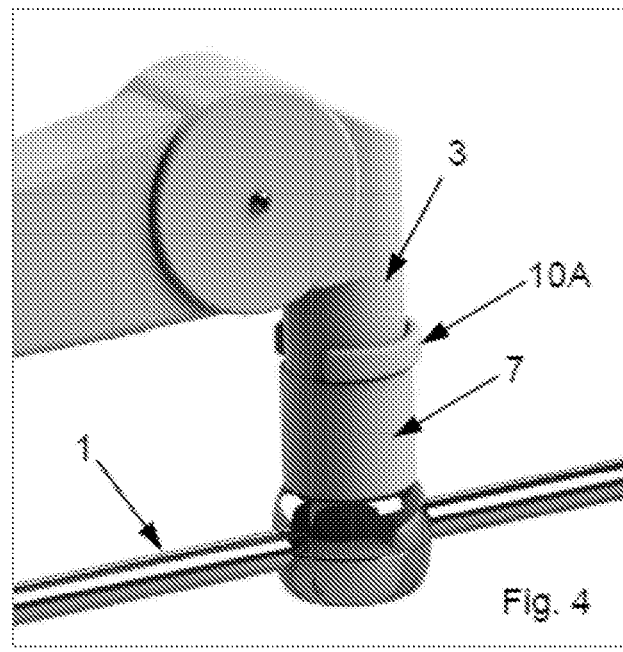
FIG. 4 shows a perspective view of the attachment means of the suspension arm shown in FIG. 3.
Figure 5:
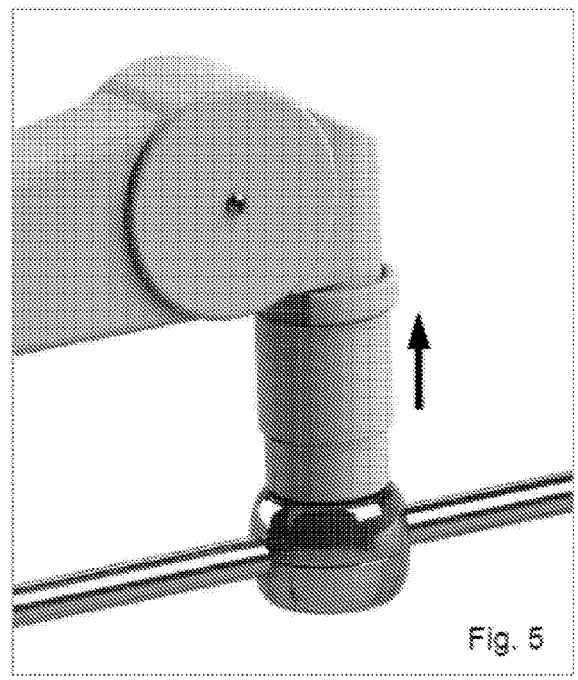
FIG. 5 shows another perspective view of the attachment means of the suspension arm shown in FIG. 3.

FIGS. 3 to 5 show how a prior art suspension arm, as described in FIGS. 1 and 2, can be adapted to become a suspension arm according to the present invention.

A split snap ring 10A constituting a delimeter, is placed around the connecting piece 3. The presence of the ring 10A can be clearly seen by visual inspection from any direction. In the event that screw 8 comes loose or is not replaced during a service or maintenance of the suspension arm, it is possible that sleeve 7 could move upwards in use.

However, in view of the presence of the snap ring 10A acting as the delimeter, the sleeve is prevented from moving to a position where securing segment 9 is exposed and could become dislodged. The failure of the suspension arm is therefore prevented.

Figure 6A:
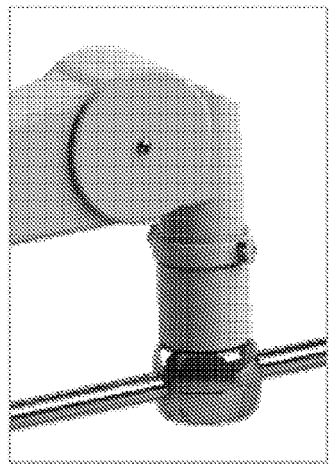
FIGS. 6a and 6b are perspective views of another suspension arm according to the present invention.
Figure 6B:
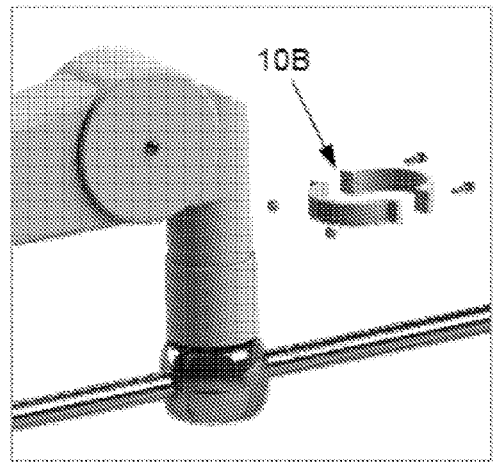

FIGS. 6a and b show an alternative form of delimeter by employing a split shaft collar 10B.

Figure 7A:
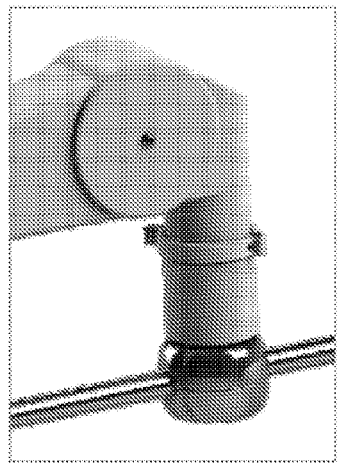
FIGS. 7a and 7b are perspective views of another suspension arm according to the present invention.
Figure 7B:
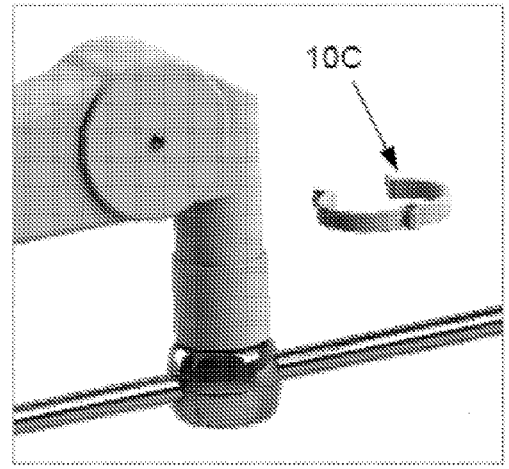

FIGS. 7a and b show an alternative form of delimeter by employing a hinged split shaft collar 10C.

Figure 8A:
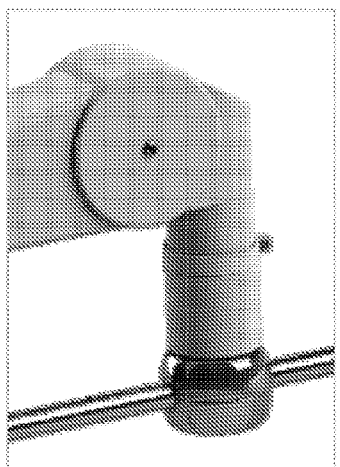
FIGS. 8a and 8b are perspective views of another suspension arm according to the present invention.
Figure 8B:
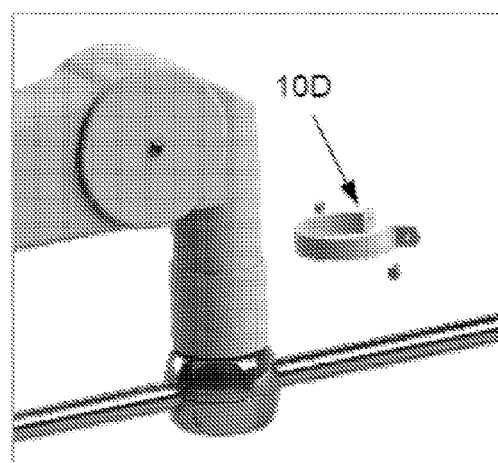

FIGS. 8a and b show an alternative form of delimeter by employing a flexible collar 10D.

The invention claimed is:

1. An apparatus for supporting a depending device, the apparatus comprising:
   an arm, one end of which comprises a depending hollow attachment housing, into which is inserted a corresponding attachment portion of the depending device, the attachment housing and attachment portion both having corresponding openings which come into alignment when the attachment portion is inserted into the attachment housing;
   a securing segment which passes through the aligned openings in the attachment housing and attachment portion thereby to prevent the vertical separation of the attachment housing and attachment portion;
   a sleeve which surrounds the attachment housing and is vertically moveable between a first position wherein it exposes the openings and securing segment and a second position wherein it covers the securing segment thereby preventing the securing segment from becoming dislodged in use, wherein the sleeve is further vertically moveable to an intermediate position between the first position and the second position, and wherein in the intermediate position, the sleeve covers the securing segment thereby preventing the securing segment from becoming dislodged in use; and
   a removable delimeter which reduces the allowable vertical movement of the sleeve so that in use its vertical movement is restricted so as to prevent the sleeve adopting its first position, wherein the delimeter takes the form of a collar passing substantially around the circumference of the attachment housing, wherein the collar is sized to slide along the attachment housing above the sleeve and engage a transverse portion of the arm to define the intermediate position of the sleeve responsive solely to the sleeve being moved from the second position toward the first position.

2. The apparatus according to claim 1, wherein the arm is a spring arm that can rotate horizontally and move vertically.

3. The apparatus according to claim 1, wherein the hollow attachment housing is a hollow tube into which is inserted a cylindrical attachment portion of the depending device.

4. The apparatus according to claim 1, wherein the opening in the attachment housing is a horizontal slit.

5. The apparatus according to claim 4, wherein the opening in the attachment portion comprises a horizontal slit or notch.

6. The apparatus according to claim 4, wherein the securing segment is elongate.

7. The apparatus according to claim 1, wherein the depending device is a medical device, particularly an x-ray shield.

8. The apparatus according to claim 1, wherein the collar has an inner surface that is free of projections, thereby permitting the collar to slide along the attachment housing.

9. A method of adapting an apparatus for supporting a depending device, the apparatus comprising an arm, one end of which comprises a depending hollow attachment housing, into which is inserted a corresponding attachment portion of the depending device, the attachment housing and attachment portion both having corresponding openings which come into alignment when the attachment portion is inserted into the attachment housing, the apparatus comprising a securing segment which passes through the aligned openings in the attachment housing and attachment portion thereby to prevent the vertical separation of the attachment housing and attachment portion, the apparatus further comprising a sleeve which surrounds the attachment housing and is vertically moveable between a first position wherein it exposes the openings and securing segment and a second position wherein it covers the securing segment thereby preventing the securing segment from becoming dislodged in use, the method comprising:

attaching a removable delimiter to the attachment housing thereby reducing the allowable vertical movement of the sleeve so that its vertical movement is restricted so as to prevent the sleeve adopting its first position, wherein the delimeter takes the form of a collar passing substantially around the circumference of the attachment housing; and sliding the sleeve upward from its second position toward its first position and into an intermediate position, in which the sleeve covers the securing segment, wherein without separate manipulation of the collar by a user, the sliding the sleeve causes the collar to slide upward and into engagement with a transverse portion of the arm, and wherein the collar prevents the sleeve from further sliding into its first position.

10. The method according to claim 9, wherein the arm is a spring arm that can rotate horizontally and move vertically.

11. The method according to claim 9, wherein the hollow attachment housing is a hollow tube into which is inserted a cylindrical attachment portion of the depending device.

12. The method according to claim 9, wherein the opening in the attachment housing is a horizontal slit.

13. The method according to claim 12, wherein the opening in the attachment portion comprises a horizontal slit or notch.

14. The method according to claim 12, wherein the securing segment is elongate.

15. The method according to claim 9, wherein the depending device is a medical device, particularly an x-ray shield.

16. The method according to claim 9, wherein the collar has an inner surface that is free of projections, thereby permitting the collar to slide along the attachment housing.

* * * * *